US011182185B2

(12) United States Patent
Su et al.

(10) Patent No.: US 11,182,185 B2
(45) Date of Patent: Nov. 23, 2021

(54) NETWORK-BASED SIGNALING TO CONTROL VIRTUAL MACHINE PLACEMENT

(71) Applicant: VMware, Inc., Palo Alto, CA (US)

(72) Inventors: Chi-Hsiang Su, Santa Clara, CA (US); Sachin Thakkar, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/317,297

(22) Filed: Jun. 27, 2014

(65) Prior Publication Data
US 2015/0378760 A1    Dec. 31, 2015

(51) Int. Cl.
*G06F 9/50*     (2006.01)
*G06F 9/455*    (2018.01)
*H04L 29/08*    (2006.01)

(52) U.S. Cl.
CPC ...... *G06F 9/45558* (2013.01); *H04L 67/1004* (2013.01); *G06F 2009/4557* (2013.01)

(58) Field of Classification Search
CPC .. G06F 7/78; G06F 8/00–78; G06F 9/44–455; G06F 11/36; G06F 9/45558; G06F 2009/4557; H04L 67/1004
See application file for complete search history.

(56) References Cited

U.S. PATENT DOCUMENTS

| | | | | |
|---|---|---|---|---|
| 5,751,965 A * | 5/1998 | Mayo | ................. | H04L 41/0213 709/224 |
| 9,009,217 B1 * | 4/2015 | Nagargadde | ........ | G06F 17/5009 709/203 |
| 2007/0280102 A1 * | 12/2007 | Vasseur | ..................... | H04J 3/14 370/225 |
| 2011/0022694 A1 * | 1/2011 | Dalal | ................. | H04L 41/0843 718/1 |
| 2012/0192181 A1 * | 7/2012 | Gilbert | ............... | G06F 9/45558 718/1 |
| 2013/0007254 A1 * | 1/2013 | Fries | ................... | H04L 43/0876 709/224 |
| 2013/0086298 A1 * | 4/2013 | Alanis | ................... | G06F 9/4856 711/6 |
| 2013/0148494 A1 * | 6/2013 | Abbas | ................... | H04L 47/746 370/225 |
| 2013/0174151 A1 * | 7/2013 | Nakajima | ............... | G06F 9/461 718/1 |
| 2013/0283266 A1 * | 10/2013 | Baset | ...................... | G06F 9/485 718/1 |
| 2013/0297753 A1 * | 11/2013 | Lu | ....................... | G06F 9/45558 709/220 |

(Continued)

*Primary Examiner* — Doon Y Chow
*Assistant Examiner* — Timothy P Duncan (57) ABSTRACT

A virtualized computing environment includes a plurality of host computers, each host being connected to a physical network and having a hypervisor executing therein. To provision a virtual machine requiring a connection to a virtual network in one of the hosts, a candidate host for hosting the virtual machine, the candidate host having the virtual network configured therein, is selected. A request is then made for a status of the virtual network to the candidate host. The status of the virtual network is then received from the candidate host. If the virtual network is available, then the virtual machine is deployed to the candidate host. If the virtual network is not available, then a second candidate host is selected for hosting the virtual machine.

20 Claims, 4 Drawing Sheets

(56) References Cited

U.S. PATENT DOCUMENTS

| | | | |
|---|---|---|---|
| 2014/0056298 A1* | 2/2014 | Vobbilisetty | H04L 12/46 370/355 |
| 2014/0201743 A1* | 7/2014 | Ali | G06F 9/45533 718/1 |
| 2014/0309815 A1* | 10/2014 | Ricci | B60R 25/20 701/2 |
| 2015/0248303 A1* | 9/2015 | Noel | G06F 9/4856 718/1 |
| 2016/0080496 A1* | 3/2016 | Falanga | H04M 3/22 709/217 |

* cited by examiner

NETWORK-BASED SIGNALING TO CONTROL VIRTUAL MACHINE PLACEMENT

BACKGROUND

In virtualized computing environments, network support may be provided by instantiating virtual networking components in a virtualized host computer and connecting these components to form a virtual network. When virtual machines are deployed to a virtualized host (i.e., a host that is capable of executing virtual machines under the control of a hypervisor), the host needs to be prepared to accommodate the virtual machines from a networking standpoint. That is to say, software that implements the virtual network must be in place and operational in the host before the virtual machine is deployed. For example, if a virtual machine is deployed to a host that does not have a working virtual network, then the virtual machine will not be able to communicate with other virtual machines or with applications that are external to the host. As another example, a virtual machine that is deployed to a host that does not have an operational virtual firewall will run unprotected if it is deployed and started on that host.

Virtual machine deployment solutions may lack information as to whether expected virtual networking connectivity of a host is available. Therefore, using typical deployment solutions, it is possible to deploy a virtual machine to a host that does not have the network support needed by the virtual machine. When a target host machine lacks required network connectivity for a virtual machine, an attempted deployment or migration of the virtual machine to the host can result in impeded or loss of functionality of any applications running on that virtual machine.

SUMMARY

One or more embodiments provide techniques for determining, prior to deployment, the status of the virtual network on a host computer to which one or more virtual machines are to be deployed. In one embodiment, a method of provisioning a virtual machine in a host computer comprises the steps of selecting a candidate host having the virtual network configured therein, requesting a status of the virtual network to the candidate host, and receiving the status of the virtual network from the candidate host. If the virtual network is available, the method deploys or migrates the virtual machine to the candidate host. In this method, if the virtual network is not available, a second candidate host for hosting the virtual machine is selected for possible deployment thereto.

In a second embodiment, a hypervisor performs a method of managing a status of a virtual network in a host in which the hypervisor executes, the method comprising the steps of receiving the status of the virtual network and storing the status of the virtual network in a repository. The method further comprises the steps of receiving a request from a requestor to provide the status of the virtual network and, responsive to receiving the request, reading the status of the virtual network from the repository and transmitting the status of the virtual network to the requestor.

In a third embodiment, a virtualized computing system is provided. The system comprises a plurality of host computers including a first host, the first host having a hypervisor executing therein, and the hypervisor having instantiated therein a virtual network. The system also comprises a physical network that the plurality of host computest connect to. The system comprises a virtual network management server configured to deploy virtual networks to the host computers and a virtual machine management server configured to deploy virtual machines to the host computers.

DETAILED DESCRIPTION

Figure 1:
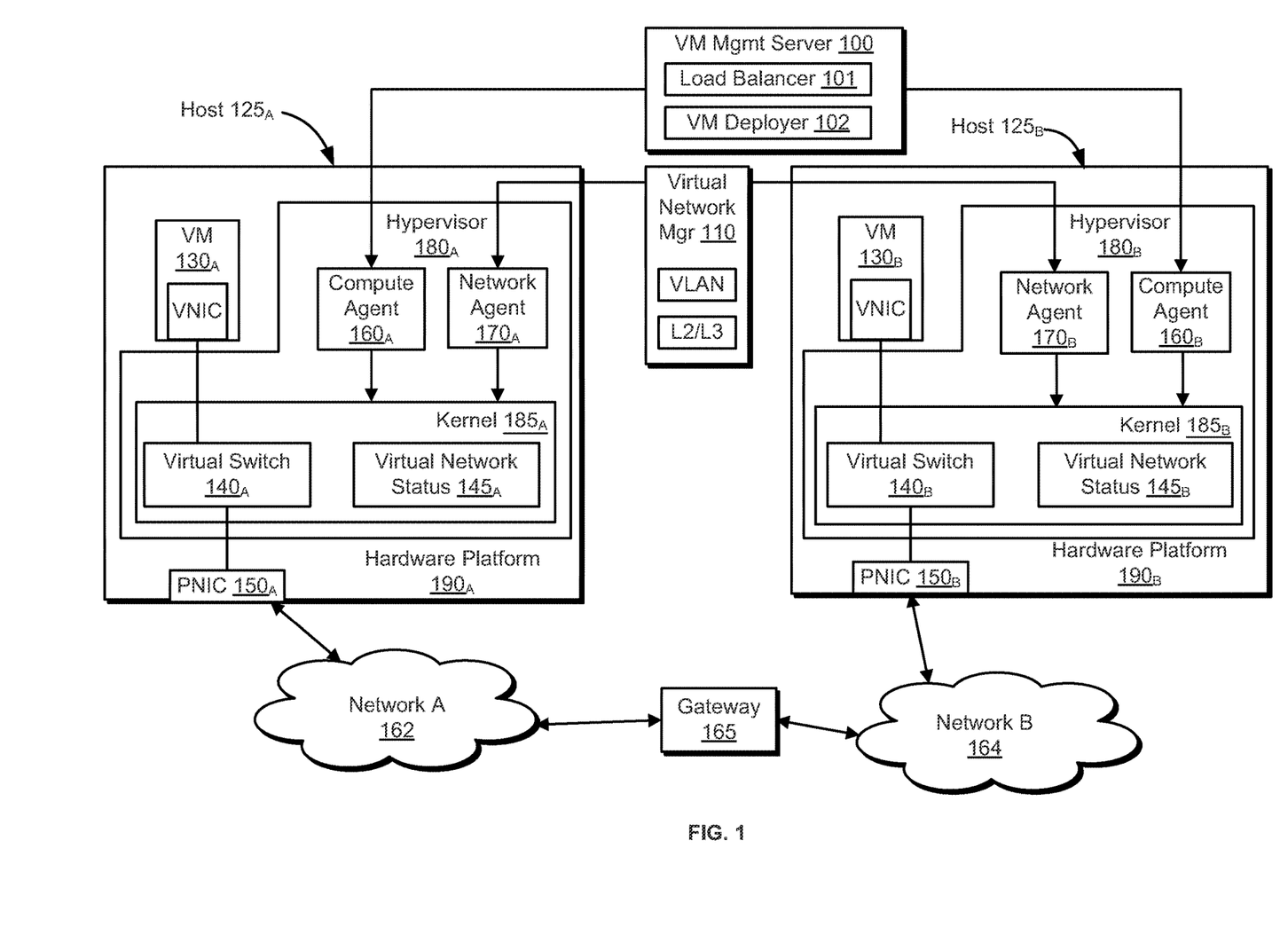
FIG. 1 is a block diagram that depicts a virtualized computing environment in which one or more embodiments may be implemented.

FIG. 1 is a block diagram that depicts a virtualized computing environment in which one or more embodiments may be implemented. The components of the virtualized computing environment include, but are not limited to, one or more computer hosts 125 (125$_A$ and 125$_B$ shown), each of which connect to one or more computer networks 162$_A$, 162$_B$. Further, the virtualized computing environment includes a virtual machine management server 100 and a virtual network manager 110.

As shown, the embodiment depicted in FIG. 1 includes hosts 125$_A$ and 125$_B$. In certain embodiments, each host 125$_A$, 125$_B$ is, a server-class computer with one or more central processing units (CPUs) (not shown), random access memory (RAM) (not shown), and is attached to one or more external data storage devices (not shown) through a host bus adapter (HBA) (not shown). In alternative embodiments, hosts 125$_A$, 125$_B$ may be commercially available desktop computers, laptop computers, tablets, and the like. Conceptually, CPUs, RAM, and other hardware components are included in a "hardware layer" depicted in FIG. 1 as hardware platforms 190$_A$, 190$_B$.

As shown, each of hardware platforms 190 also includes one or more physical network interface controllers (PNICs), including PNICs 150$_A$ and 150$_B$. A description of PNICs 150$_A$, 150$_B$ is given herein as representative of other PNICs that may be implemented in hardware platform 190 but not shown in FIG. 1. Each PNIC 150 provides the corresponding host 125 with connectivity to a computer network. In embodiments, each PNIC 150 sends and receives network data packets over a physical network connection to a wired computer network, such as an Ethernet or other local area network (LAN). In other embodiments, PNIC 150 may be a wireless network adapter that sends and receives data packets over a wireless network, such as a wireless LAN based on the IEEE® 802.11 standard (i.e., a Wi-Fi® network). Each PNIC 150 also has unique media access control (MAC) and IP addresses, which enables the corresponding host 125 to be located on the network to which the PNIC connects.

Each of hosts 125 executes system software that manages access to the components residing in hardware layer 190 by application programs or, in some instances, virtual machines. This system software is referred to herein as a hypervisor kernel 185. As shown in FIG. 1, host 125$_A$ executes hypervisor kernel ("Kernel") 185$_A$ and host 125$_B$ executes hypervisor kernel $185_B$. Each hypervisor kernel $185_A$, $185_B$ performs the functions that are typically performed by an operating system, such as controlling and allocating hardware resources of the corresponding host 125, scheduling and dispatching processes for execution on the host, and providing user interface and input/output services. Hypervisor 180 includes kernel 185 and other components, such as one or more virtual machine monitors (not shown) that function as the emulation layer enable the concurrent instantiation and execution of one or more virtual machines (VMs) (only one shown on each host), depicted in FIG. 1 as VMs $130_A$ and $130_B$. In one embodiment, each hypervisor 180 may be ESXi® Server, which is commercially available from VMware, Inc. of Palo Alto, Calif. In other embodiments, hypervisor 180 may be another hypervisor, such as KVM, which provides virtualization functionality to the Linux kernel and is available for various popular Linux distributions including Debian, Red Hat, SUSE, Ubuntu, and others. The virtualization architecture described herein is exemplary only and does not necessarily form part of the present invention, and any architectural variations from that shown in FIG. 1 is contemplated. For example, in some virtualization implementations, the driver (not shown) for PNIC 150 may reside in a privileged virtual machine, referred to as "domain zero" ("Dom0") or the "root partition" through which input/output data to and from VMs may pass. In other implementations, a host operating system manages physical resources while co-resident system-level software provides virtualization services (e.g., physical device emulations) for each virtual machine. The virtualization software may be provide paravirtualization, which requires that the guest operating system executing within the virtual machine be aware of the virtualization and/or cooperate with the virtualization software in some manner. It should furthermore be recognized that the boundaries between VM 130 and hypervisor 180 are somewhat arbitrarily drawn because, while it is convenient to refer to a virtual machine as including virtual hardware such as VNICs, the processes that emulate that hardware are often considered to reside within or form part of hypervisor 180. The term, "hypervisor" has no consistent meaning but is used herein to refer to all the software logically interposed between a virtual machine and the hardware platform that enables the virtual machine to operate, including any required input/output connectivity.

As mentioned above, each hypervisor 180 enables the instantiation of one or more VMs 130. After instantiation, each VM 130 can be thought of as an encapsulation of a physical computing machine platform that is executed under the control of the hypervisor. VMs 130 may be configured with virtual devices that are embodied in a virtual hardware platform (not shown), which comprises one or more virtual CPUs, virtual RAM, and virtual storage devices. The virtual hardware platform supports the installation of a guest operating system on the VM, which is capable of supporting the execution of software applications. Examples of guest operating systems include any of the well-known commodity operating systems, such as Microsoft Windows®, Linux®, etc.

As shown in FIG. 1, each of VMs 130 also includes one or more virtual network interface controllers (or VNICs) (only one shown for each VM). VNICs perform functions analogous to those performed by PNICs 150. That is, a VNIC receives and sends data packets to and from a virtual machine. As with PNIC 150, each VNIC has a unique MAC address and an IP address.

Each VNIC connects the corresponding VM 130 to a network in the same way each PNIC 150 connects a corresponding physical host 125 to a network. Virtual switches $140_A$, $140_B$ provide connectivity between and among VMs executing on each host and with the outside world over physical and/or virtual networks. Conceptually, virtual networks are logical networks implemented by a set of network devices to which one or more virtual machines connect in order to communicate amongst themselves. Network devices may include switches, firewalls (which control incoming and outgoing traffic for the virtual network), and bridges and routers (which, in embodiments, route network traffic between networks. Virtualized networks may be implemented by one or more hypervisors $180_A$, $180_B$, as further described by way of example below.

In FIG. 1, hypervisor $180_A$ of host $125_A$ and hypervisor $180_B$ of host $125_B$ each have instantiated therein a respective virtual switch, namely, virtual switches $140_A$ and $140_B$. One or more virtual switches $140_A$, $140_B$ may be managed and/or configured as opaque virtual networks. For example, the creation, configuration, and management of virtual switches 140 may be handled by a centralized virtual network manager 110 which can be a third-party provider, such that the details and configuration of the virtual network are not readily available to hypervisors 180, VM management server 100, or other software components that may rely on networking information. In these cases, opaque virtual networks are managed by a network management plane (also described below) separate from the virtual machine (or "compute") management plane. In embodiments, a virtual machine management platform (or hypervisor) accesses an opaque network by referring to it by a unique network identifier. For example, virtual machine management platforms typically deploy virtual machines to a hypervisor 180 executing on a particular host 125. Among the tasks that the virtual machine management platform performs is provisioning a virtual network to a deployed virtual machine. In embodiments that provide opaque virtual networks, the virtual machine management platform connects the virtual machine to the opaque network by configuring the virtual machine to access the network using the unique network identifier. The virtual machine is then able to transmit and receive data over the opaque network based on this identifier. Virtual machine management platforms, hypervisor (or components thereof aside from a third-party managed virtual switch 140, or components thereof), and the virtual machine itself need not be aware of the details of the network. Rather, the configuration details are separately handled by a virtual network manager 110, the detailed functions of which are further described below. In this way, virtual machine (or "compute") management is decoupled from virtual network management.

As shown in FIG. 1, each virtual switch 140 also connects to one or more PNICs 150 (only one shown) on the corresponding host 125. This enables VMs 130 executing on hypervisor 180 in one host to communicate with applications that are external to the host, or with other VMs that execute on another host. Thus, in FIG. 1, virtual switch $140_A$, which is instantiated within hypervisor $180_A$ on host $125_A$, connects, via PNIC $150_A$, to network A 162. Thus, VMs $130_A$ that connect to virtual switch $140_A$ of host $125_A$ are able to communicate with servers and applications that also connect to (or are accessible from) network A 162. In like manner, PNIC $150_B$ of host $125_B$ connects directly to network B 164. Therefore, VMs $130_B$ that execute on top of hypervisor $180_B$ of host $125_B$ are able to communicate (via virtual switch $140_B$ instantiated within hypervisor $180_B$ of host $125_B$) with applications and computers connected directly to network B 164.

In addition, in the embodiment depicted in FIG. 1, a gateway 165 exists between networks A and B 162, 164, respectively. In certain embodiments, gateway 165 is a physical router or a proxy server that routes traffic between networks A and B. Thus, in the embodiment of FIG. 1, gateway 165 enables VMs $130_A$ on host $125_A$ to communicate with VMs $130_B$ on host $125_B$.

Further, VMs 130 on each of hosts $125_A$ and $125_B$ may be configured as existing on the same VLAN, overlay network, or other logical network or network segment. An example of an overlay network is a logical layer 2 network that is implemented on a layer 3 network using a VPN tunnel or other traffic isolation technology. In such an embodiment, VMs 130 executing on each of hosts $125_A$ and $125_B$ connect to the designated logical network or network segment and communicate with each other through networks A and B with some measure of isolation that is afforded by the logical network technology or implementation. In one embodiment, virtual switches $140_A$, $140_B$ implement the logical overlay network by encapsulating and decapsulating, respectively, outgoing and incoming packets. In another embodiment, the virtual network is implemented using VLAN tagging, in which case VMs $130_A$ and $130_B$ may be assigned to the same port group on virtual switches $140_A$, $140_B$ and hence transmitted packets may be tagged with a corresponding VLAN tag, in a known manner, either at the VM or within some component such as the virtual switch 140, of each hypervisor 180.

FIG. 1 also depicts management servers that provide, respectively, virtual machine and network management for the virtualized computing environment. VM management server 100 provides virtual machine management services. VM management server 100 typically executes on one or more physical servers and/or within one or more VMs. VM management server 100 performs virtual machine management functions on hosts 125 by communicating with an associated agent process on each host, which is depicted as compute agents 160A and 160B on hosts $125_A$ and $125_B$, respectively. In certain embodiments, a system administrator may access VM management server 100 through a user interface, (e.g., using a web-based interface) and instruct VM management server 100 to perform specific virtual machine management functions, such as starting and stopping VMs 130, and performing certain configuration changes on the VMs. VM management server 100 then communicates directly, e.g., using a RESTful API, with a compute agent 160 executing on a host 125 in order to carry out the instructions.

As shown, VM management server 100 includes at least two components: a load balancer 101 and a VM deployer 102. Through load balancer 101, VM management server 100 provides for the balancing of compute resources among a plurality of VMs. For example, load balancer 101 may detect that a particular host computer (e.g., host $125_A$) is experiencing a performance bottleneck, which may be caused by having too many VMs instantiated therein. As a result, load balancer 101 determines that one or more VMs should be migrated away from host $125_A$ to another host 125 (e.g., host $125_B$, where host $125_B$ does not experience a performance bottleneck). In this case, load balancer 101 first determines that target host $125_B$ provides the required level of support for the migrated VMs $130_A$ that the source host provides before initiating migration. That is, load balancer 101 determines that the target host $125_B$ has sufficient CPU and memory resources available in order to instantiate and execute the migrated VM. Further, load balancer 101 may be configured to ensure that target host $125_B$ has the required network connectivity for the migrated VM. In other words, prior to migrating a VM to a target host, load balancer 101 ensures that a virtual network has been configured on the target host and that the configured virtual network provides the same or sufficient connectivity for the migrated VM as was provided for the VM by the source host.

However, as mentioned above, in some embodiments, virtual machine management platforms (i.e., VM management server 100) may lack sufficient network configuration information to determine whether the network connectivity that is expected by VM $130_A$ is available on the target host, and that such connectivity is operative, i.e., functioning as expected. For example, referring to FIG. 1, load balancer 101 may determine that VM $130_A$ on host $125_A$ needs to be migrated. Accordingly, load balancer 101 inspects host $125_B$, by communicating with compute agent $160_B$, to determine, among other things, whether host $125_B$ has the required physical network connectivity for VM $130_A$. Load balancer 101 (through compute agent $160_B$) also determines whether host $125_B$ has sufficient CPU and memory resources to support migration of VM $130_A$. However, compute agent $160_B$ may lack network configuration and status information with respect to network connectivity required by VM $130_A$. In fact, such information may not be directly ascertainable by hypervisor $180_B$. For example, a required virtual network may be unavailable because one or more software or hardware components that make up the virtual network have failed. Further, if one or more of a plurality of PNICs $150_B$ (only one shown) on host $125_B$ have failed, then host $125_B$ may not provide the required connectivity for the migrated VM 130, namely, connectivity to networks A and B. Additionally, the required virtual network may be available, but may be running in a degraded state due to performance bottlenecks or the failure of one or more physical links in network A or network B. Therefore, according to one or more embodiments, load balancer 101 determines the operational status of virtual network 140 by communicating (via compute agent $160_B$) with other components of hypervisor $180_B$, as will be described below.

As shown in FIG. 1, VM management server 100 also includes VM deployer 102 for deploying one or more virtual machines to a target host 125. In one or more embodiments, VM deployer 102 reads configuration data pertaining to a VM that is to be deployed and determines (by communicating with a compute agent 160) whether the target host 125 has sufficient resources to support instantiation of the VM. The configuration of a VM may be provided in one or more configuration files associated with the VM and may include the configuration of one or more VNICs and designated port group, virtual network identifier for opaque networks, or other information identifying a virtual network, which is used to determine which virtual networks 140 that the VNICs are to be connected to. However, as was the case for load balancer 101, VM deployer 102 may initially lack specific configuration and status information about virtual networks configured on a target host 125. However, embodiments of VM deployer 102 determine the status of the virtual network by communicating (via a compute agent 160) with a hypervisor 180, according to methods described below.

FIG. 1 also depicts virtual network manager 110. Virtual network manager 110 is a software component that runs on one or more physical servers or within virtual appliances, and provides virtual network management services to the virtualized computing environment. A system administrator may access virtual network manager 110 through a user interface, such as a web interface, and provide instructions through the interface to manage the various virtual network components deployed to the computing environment. The management instructions are transmitted from virtual network manager 110 to one or more corresponding network agents 170, each of which executes in a host 125. Network agent 170 then carries out tasks on the corresponding host 125 associated with the management instructions.

Among the functions that virtual network manager 110 performs are the creation and configuration of virtual networks for hosts 125. That is, a system administrator accesses virtual network manager 110 to create and configure virtualized networks. Configuration may be performed by virtual network manager 110 transmitting a request to a network agent 170 executing on one or more of the hosts 125. Each network agent 170 then communicates with other components, such as kernel 185 or some subcomponent thereof such as virtual switch 140 in order to instantiate the virtual network configurations on the target host. Once the configurations are deployed, each virtual machine 130 may then be connected to the one or more of the virtual networks via the target host.

As shown in FIG. 1, virtual network manager 110 deploys different types of virtual networks. One type that is depicted is a virtual LAN (or VLAN), which, in embodiments, comprises a plurality of ports of a plurality of virtual switches that are configured as being connected in a single VLAN network segment. Another type is an L2 over L3 overlay logical network, in which configurations for encapsulating layer 3 (L3) packets within a layer 2 (L2) encapsulation are provisioned to a plurality of hosts. In such a configuration, virtual network 140 on host 125 appends additional header information to data packets transmitted by the VMs and tunnels the traffic to destination hosts that hosts a destination VM, which then, according to the deployed configurations, decapsulates the L3 packet, i.e., removes the outer L2 header, for delivery to the destination VM. The L2 encapsulation enables the packets to be routed only to hosts containing other VMs that are connected to the same virtual network, even if those virtual machines execute on a different host.

In some embodiments, virtual network manager 110 also monitors the physical network of the virtualized computing environment, as well as the virtualized network components instantiated in each host 125. Such monitoring can be by way of proprietary management channels, protocols, etc., implemented by various network device vendors. Specifically, embodiments of virtual network manager 110 are configured to detect outages to physical network devices. For example, referring to FIG. 1, virtual network manager 110 is configured to detect whether gateway 165 is available, or whether either PNICs 150 on either host $125_A$ or $125_B$ have failed. Further, through network agent 170, virtual network manager 110 is configured to detect whether a virtual network 140 (or any sub-component of the virtual network) is available. Management traffic from virtual network manager 110 and VM management server 100 to hosts 125 may be routed over an isolated management network (not shown) with communications arriving at separate PNICs (not shown) on each host $125_A$, $125_B$, to provide management communication independent of tenant or VM data traffic on networks A and B.

As was previously mentioned, VM management server 100 requires information as to whether virtual network connectivity exists on a host prior to deploying or migrating a virtual machine to that host. Thus, in order to ensure that virtual network resources are available to a newly deployed or migrated virtual machine, embodiments described herein set forth a mechanism whereby the status of one or more virtual networks configured on a target host is communicated to the hypervisor on the target host. Further, once the hypervisor receives the virtual network configurations, embodiments of VM management server 100 transmit, prior to deploying virtual machines to the target host, network status queries to the hypervisor in order to determine virtual network availability on the target host.

In the embodiment of FIG. 1, virtual network manager 110 (which monitors physical and virtual network resources for the virtualized computing environment) communicates to each hypervisor 180 the status of all virtual networks 140 configured on the corresponding host 125. For instance, if $PNIC\ 150_A$ on host $125_A$ should fail, then virtual network manager determines that all virtual networks $140_A$ that connect to $PNIC\ 150_A$ are in a failed status, and communicates this status (via network agent $170_A$) to kernel $185_A$. This is depicted in FIG. 1 as communication from network agent $170_A$ to kernel $185_A$.

Virtual network status $145_A$ and $145_B$ shown in FIG. 1 are repositories where the status of each corresponding virtual networks configured on host 125 is stored. In various embodiments, each network agent 170 periodically communicates a status of configured virtual networks to a corresponding kernel 185. Kernel 185 then stores the status information in a virtual network status 145. Each virtual network status 145 may be structured as a list of name/value pairs, where the name is a unique network identifier for a virtual network. The value is an indicator as to the status of the network. For example, the network status may be "available" or "unavailable." Further, intermediate values may be stored in order to provide an indication that the virtual network provides connectivity, but operates in an impaired state. Such a case may arise when all necessary components along a network path are available, but where certain redundant components which serve to enhance network performance or reliability are unavailable.

Once a hypervisor 180 obtains and stores status 145 of the configured virtual networks, status 145 may then be used by other components of the virtualized computing environment. For instance, VM management server 110 may look to deploy one or more virtual machines to host $125_A$. In certain embodiments, VM management server might transmit a network status request to compute agent $160_A$. Compute agent $160_A$ then sends a request to kernel $185_A$ regarding the status of the virtual networks configured on host $125_A$. In response, kernel $185_A$ accesses virtual network status $145_A$ and sends the virtual network status stored therein to compute agent $160_A$. Compute agent $160_A$ can then provide the status to VM management server 100, which is then able to make a deployment decision based on the status of the virtual networks available on host $125_A$. If the network status indicates that none of virtual networks are available (or that only virtual networks that are incompatible with the to-be deployed virtual machine are available), then VM management server 100 can choose to deploy the VM to another host.

VM management server 100 performs a similar process when executing load balancer 101 in order to determine whether to migrate a VM to a target host 125. In this case, load balancer 101 transmits a network status request to a compute agent 160. Compute agent 160 transmits a network status request to a corresponding kernel 185, which responds to the request by accessing its virtual network status 145 and transmitting the network status of each virtual network accessible on that host to compute agent 160. Compute agent 160 then transmits the network status back to load balancer 101 executing in VM management server 100. If the network status indicates that no available virtual network on host 125 can provide the required connectivity to the VM to be migrated, then load balancer 101 would not perform the migration to that host.

Figure 2:
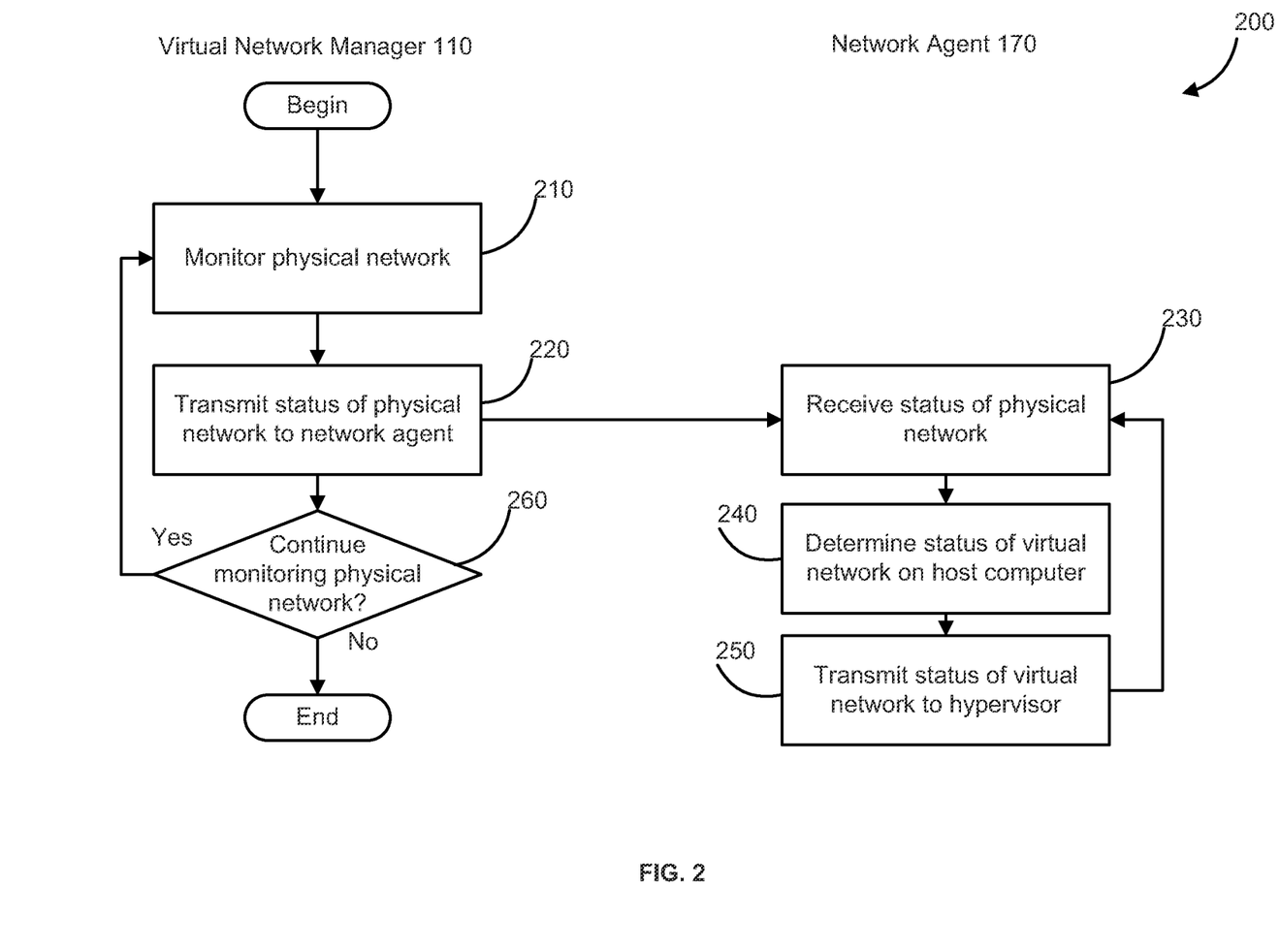
FIG. 2 is a flow diagram that illustrates a method for monitoring the status of one or more virtual networks on a host, according to embodiments.

FIG. 2 is a flow diagram that illustrates a method 200 for monitoring the status of one or more virtual networks on a host, according to embodiments. The steps of method 200 are performed by virtual network manager 110 and a network agent 170.

Method 200 begins at step 210, where virtual network manager 110 performs a process of monitoring a physical network to which host computers are connected. That is, virtual network manager 110 monitors the gateways, routers, links, bridges, and physical NICs that comprise the network connectivity for VMs. With reference to FIG. 1, this includes networks A and B, gateway 16, and physical NICs 150 of servers $125_A$ and $125_B$. It should be noted that, in one or more embodiments, virtual network manager 110 is also configured to monitor one or more virtualized network components.

Next, at step 220, virtual network manager 110 transmits the physical network status information to a network agent 170. At step 230, network agent 170 receives the status information. At step 240, network agent 170 determines the status of each of the virtual networks configured on the host on which it executes. In embodiments, network agent 170 makes this determination based on the received physical network status as described above. For example, if the network status indicates that some physical network components (such as a router in network A) are unavailable, then network agent 170 may determine that one or more virtual networks are unavailable, or are available, but impaired. Further, the network status information may indicate that all physical network components are operating. Yet, network agent 170 may independently determine that one or more software components that embody a virtual network on the host have failed. In such a case, network agent 170 determines that one or more virtual networks are unavailable or impaired, depending on how critical the failed software components are.

After determining the status of the virtual networks on the host at step 240, method 200 then proceeds to step 250. At step 250, network agent 170 transmits the status of the virtual networks on the host to another component of hypervisor 180 such as kernel 185 (or subcomponents thereof) that executes on that host. In embodiments, network agent 170 transmits a name/value pair for each virtual network, where the name is a unique network identifier for the virtual network and the value is an indication of the status of the network. Further, once kernel 185 receives the network status, the network status is stored in a corresponding repository for later use, such as virtual network status 145 depicted in FIG. 1.

Once network agent 170 transmits the virtual network status to hypervisor 180 at step 250, method 200 returns back to step 230, where network agent 170 receives further updates regarding the status of the physical network from virtual network manager 110.

Referring back to step 220 in FIG. 2, once virtual network manager 110 transmits the status of the physical network to network agent 170, method 200 proceeds to step 260. At step 260, virtual network manager 110 determines whether to continue monitoring the physical network. In some embodiments, virtual network manager 110 monitors the physical network only upon request. In other embodiments, virtual network manager 110 continuously monitors the physical network until receiving instructions from a system administrator to cease monitoring. If the virtual network manager determines that it should continue monitoring the physical network, method 200 proceeds back to step 210, where additional monitoring of the physical network is performed, e.g., periodically every few minutes or several times an hour. If virtual network manager 110 determines, at step 260, that monitoring should not continue, then method 200 terminates.

Figure 3:
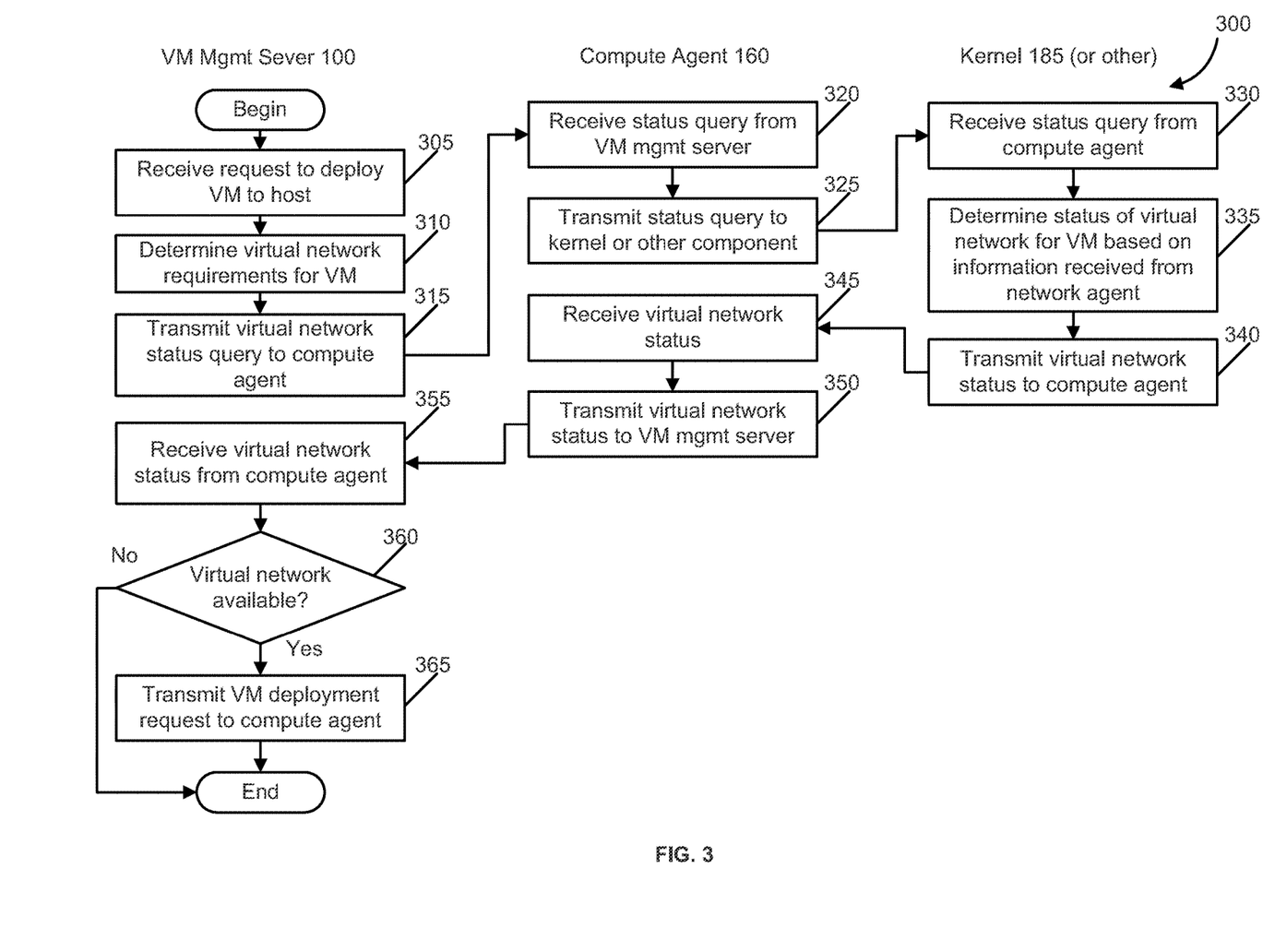
FIG. 3 is a flow diagram depicting a method of deploying a virtual machine to a host, in accordance with one or more embodiments.

FIG. 3 is a flow diagram depicting a method 300 of deploying a virtual machine to a host, in accordance with one or more embodiments of the present invention. As shown, the steps of method 300 are executed by VM management server 100, by a compute agent 160, and by a hypervisor 180.

Method 300 begins at step 305, where VM management server 100 receives a request to deploy a virtual machine to a host computer, where the host computer has a hypervisor 180 executing therein. At step 310, VM management server 100 determines the virtual network requirements for the virtual machine that is to be deployed. For instance, in one or more embodiments, VM management server 100 determines connectivity requirements for the virtual machine, as well as the types of networks that the virtual machine may connect to. These requirements may be obtained from one or more configuration files associated with the VM to be deployed. VM management server 100 then transmits, at step 315, a virtual network status query to compute agent 160. The content of the query may comprise a network type, a set of connectivity requirements, or even a specific network identifier (if the virtual machine may only connect to one specific virtual network).

Next, at step 320, compute agent 160 receives the status query from VM management server 100. Method 300 then proceeds to step 325, where compute agent 160 transmits the received status query to another component, e.g., a kernel 185, of hypervisor 180. As previously noted in the description of FIG. 2, kernel 185 (or other hypervisor component) may receive virtual network status information from network agent 170.

At step 330, the kernel or other component of hypervisor 180 receives the status query from compute agent 160. Next, at step 335, the kernel or other component determines the status of one or more virtual networks configured on the host. In some embodiments, kernel 185 determines, based on the received query, which virtual networks it should determine the status for. In some cases, the query will indicate that all virtual networks configured on the host should be checked for availability. In other cases, the query will indicate that only certain types of networks (e.g., VLANs) are to be checked. In some embodiments, kernel 185 performs the check by reading the status of the virtual networks from a repository, where the repository contains status information that the kernel received from network agent 170, as described above in connection with FIG. 2. One example of such a repository is virtual network status 145, depicted in FIG. 1.

Once the kernel or other component determines the status of the virtual networks configured on the host, method 300 proceeds to step 340, where hypervisor 180 transmits the virtual network status to compute agent 160.

It should be noted that the communication of network status information between compute agent 160 and hypervisor 180 may be achieved in other ways. For example, instead of transmitting network status information, compute agent 160 may access directly a corresponding virtual network status 145 in a producer/consumer model. In such an embodiment, kernel 185 is the producer, saving virtual network status to an associated virtual network status 145, and compute agent 160 is the consumer. Other methods of communication (such as named pipes, remote procedure call, and shared RAM) are contemplated.

Referring back to FIG. 3, once kernel 185 (or other component) transmits virtual network status to compute agent 160, method 300 proceeds to step 345, where compute agent 160 receives the network status. Next, at step 350, compute agent 160 transmits the virtual network status received from hypervisor 180 to VM management server 100. At step 355, VM management server 100 receives the virtual network status.

Method 300 then proceeds to step 360. At step 360, VM management server 100 determines, based on the received virtual network status, whether one or more virtual networks that meet the connectivity requirements of the virtual machine are in fact available. If no virtual networks are available, then method 300 terminates and the virtual machine deployment does not take place. In embodiments, VM management server 100 is configured to generate and send an error message to a system administrator that indicates that the requested virtual machine failed to deploy.

If, however, VM management server 100 determines that there is one or more available virtual networks on the host as required by the VM, then, at step 365, VM management server 100 transmits a virtual machine deployment request to compute agent 160. According to embodiments, such a deployment request includes a target network to which the deployed virtual machine should be connected. Compute agent 160 then communicates with kernel 185 in order to instantiate the virtual machine on the host.

Once the deployment request is transmitted by VM management server 100, method 300 terminates.

Figure 4:
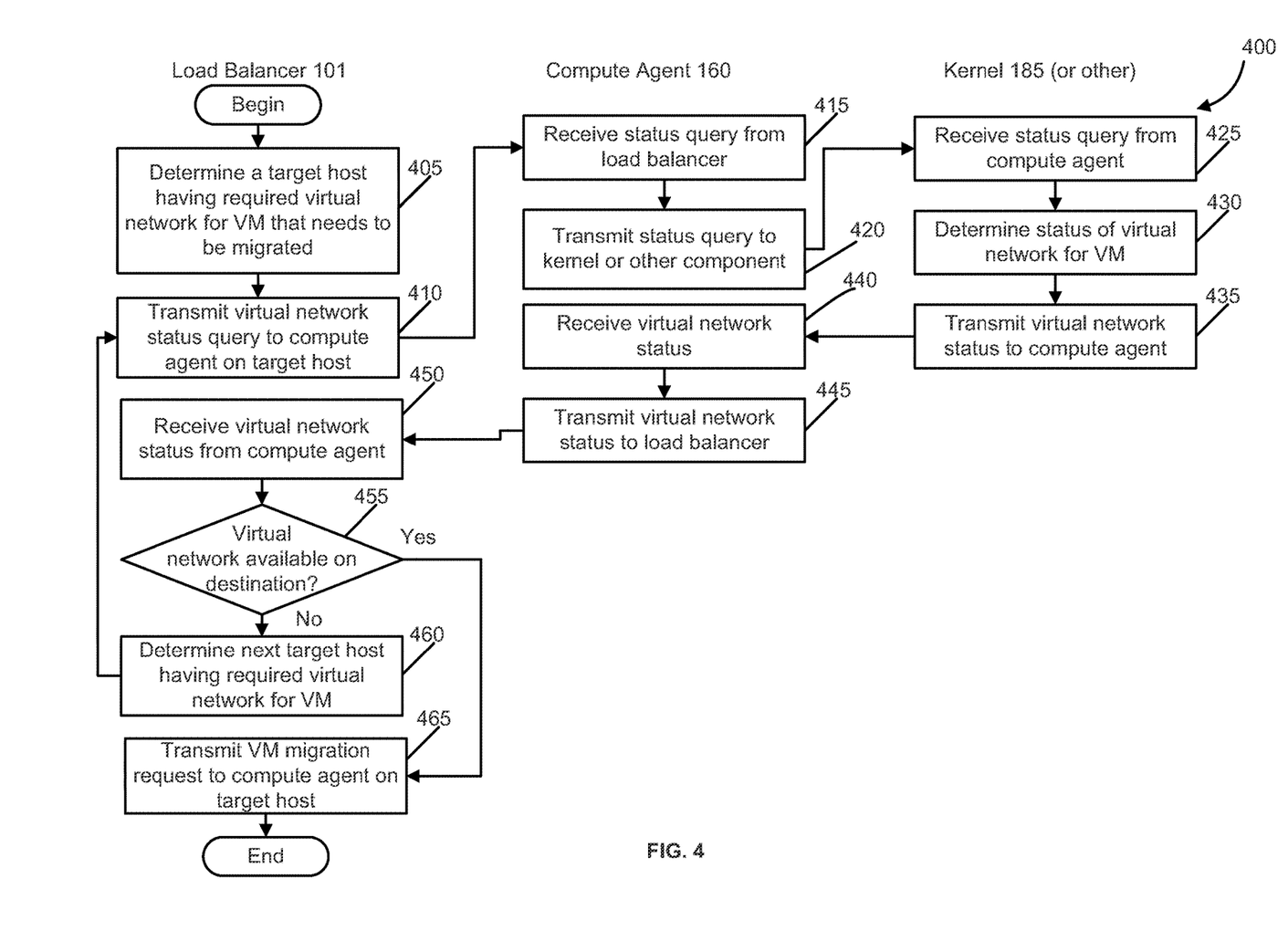
FIG. 4 is a flow diagram depicting a method of migrating a virtual machine from a source host to a target host, according to one or more embodiments.

FIG. 4 is a flow diagram depicting a method 400 of migrating a virtual machine from a source host to a target host, according to one or more embodiments. As shown in FIG. 4, the steps of method 400 are executed by load balancer 101, a compute agent 160, and a hypervisor 180.

Method 400 begins at step 405, where load balancer 101 determines a target host having the required virtual network for a virtual machine that needs to be migrated. That is, the load balancer 101 determines that a source host that the virtual machine executes on and the target host have connectivity to the same physical networks, and that the target host has a virtual network configured therein such that the virtual machine can connect to and transmit packets over the virtual network after migration is complete.

Once load balancer 101 identifies the virtual machine that is to be migrated, as well as a first target host to which the virtual machine should be migrated, then method 400 proceeds to step 410. At step 410, load balancer 101 transmits a virtual network status query to compute agent 160 executing on the target host. In embodiments, the transmitted query indicates the connectivity requirements for the virtual machine in order to enable hypervisor 180 to determine the status of a virtual network configured to meet these connectivity requirements.

Next, at step 415, compute agent 160 receives the status query from load balancer 101. Once compute agent 160 receives the status query, method 400 proceeds to step 420, where compute agent 160 transmits the status query to a another hypervisor component, such as kernel 185, subcomponent thereof, or another hypervisor component executing on the target host. Method 400 then proceeds to step 425.

At step 425, kernel 185 or other component on the first target host receives the status query from compute agent 160. Next, at step 430, hypervisor 180 determines the status of one or more virtual networks on the first target host. Hypervisor 180 determines the status in a similar manner as described in connection with step 335 of method 300, as depicted in FIG. 3. After determining the status of one or more virtual networks of the first target host, hypervisor 180 then, at step 435, transmits the virtual network status to compute agent 160.

Next, at step 440, compute agent 160 receives the virtual network status from hypervisor 180. At step 445, compute agent 160 transmits the virtual network status received from hypervisor 180 to load balancer 101. Method 400 then proceeds to step 450, where load balancer 101 receives the virtual network status.

Next, at step 455, load balancer 101 determines, based on the received virtual network status, whether one or more virtual networks that meet the connectivity requirements of the virtual machine that is to be migrated are available on the first target host. If no virtual networks are available on the first target host, then method 400 proceeds to step 460, where load balancer 101 determines a next target host having the required virtual network for the virtual machine. This next target host serves as the next candidate host to which the virtual machine may be migrated. Method 400 then proceeds back to step 410, where load balancer 101 transmits a virtual network status query to a compute agent 160 executing on the next target host. The process of determining the availability of the virtual network is then repeated.

If, however, load balancer 101 determines, based on the received virtual network status, that one or more virtual networks are available on the first target system, then load balancer 101, at step 465, transmits a migration request to compute agent 160 on the first target host. The migration request causes compute agent 160 to communicate with hypervisor 180 in order to deploy the virtual machine to the first target host.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a virtualized computing environment comprising a plurality of host computers, each host computer being connected to a physical network and having a hypervisor executing therein, a method of provisioning, in a host computer, a virtual machine requiring a connection to a virtual network which is supported by one or more components of the physical network, the method comprising:
    selecting a candidate host computer having the virtual network configured therein;
    requesting an operational status of the virtual network to the candidate host computer;
    receiving the operational status, the operational status indicating that the virtual network provides connectivity but is operating in an impaired state, the impaired state indicating that at least one redundant component which serves to enhance a performance or reliability of the virtual network has failed;
    determining whether the virtual network provides a required connectivity to the candidate host computer; and
    upon determining that the virtual network provides a required connectivity to the candidate host computer and the virtual machine operating in the impaired state, migrating the virtual machine to the candidate host computer while the virtual network is in the impaired state.

2. The method of claim 1, wherein requesting the operational status of the virtual network comprises transmitting a request to the hypervisor executing on the candidate host computer.

3. The method of claim 2, wherein the hypervisor receives the request and, in response thereto, reads the operational status of the virtual network from the repository and transmits an availability of the virtual network based on the operational status.

4. The method of claim 1, further comprising determining that the virtual machine needs to be migrated from a source host computer to a target host computer, and selecting the candidate host computer as the target host computer based on the operational status of the virtual network of the candidate host computer.

5. The method of claim 1, further comprising provisioning the virtual machine in the candidate host computer.

6. The method of claim 1, wherein the virtual network is determined to be operational when the physical network is determined to be operational.

7. The method of claim 1, wherein the operational status comprise one or more of the following: a status of physical network connectivity, and a status of central processing unit and memory resources.

8. In a virtualized computing environment comprising a plurality of host computers, each host computer being connected to a physical network and having a hypervisor executing therein, a method of managing a status of a virtual network, which is supported by one or more components of the physical network, in one of the host computers by the hypervisor executing therein, the method comprising:
    requesting an operational status of the components of the physical network from a virtual network manager, the operational status indicating whether a virtual network at the host computer meets connectivity requirements of the virtual machine;
    receiving an operational status of the components of the physical network;
    determining an operational status of the virtual network based at least in part on the received operational status of the components of the physical network and status of software components of the virtual network, the operational status of the virtual network indicating that the virtual provides connectivity but is operating in an impaired state, the impaired state indicating that at least one redundant component which serves to enhance a performance or reliability of the virtual network has failed;
    determining the virtual network provides a required connectivity to the candidate host computer; and
    migrating the virtual machine to the host computer while the virtual network is in the impaired state.

9. The method of claim 8, wherein the request is received from a virtual machine manager distinct from the virtual network manager.

10. The method of claim 9, wherein the virtual network manager monitors the physical network and one or more virtualized network components on the host computer.

11. The method of claim 10, wherein the configuration of the virtual network is visible to the virtual network manager and the configuration of the virtual network is not visible to the hypervisor.

12. The method of claim 11, wherein the hypervisor receives the request from the virtual machine manager via an agent in the hypervisor.

13. The method of claim 8, wherein the operational status of the virtual network is expressed as a name/value pair, wherein the name is an identifier of the virtual network and the value indicates the operational status of the virtual network.

14. A virtualized computing system, comprising:
a plurality of host computers including a first host computer, the first host computer having a hypervisor executing therein, and the hypervisor having instantiated therein a virtual network, which is supported by one or more components of a physical network to which the plurality of host computers connect;
a virtual network management server configured to deploy virtual networks to the host computers; and
a virtual machine management server distinct from the virtual network management server and configured to migrate virtual machines to the host computers,
wherein an agent in the hypervisor is configured to:
receive information about an operational status of the components of the physical network from the virtual network management server, the operational status indicating whether a virtual network at the first host computer meets connectivity requirements of the virtual machine,
determine an operational status of the virtual network based at least in part on the received information about the operational status of the components of the physical network and status of software components of the virtual network, the operational status of the virtual network indicating that the virtual network provides connectivity and is operating in an impaired state, the impaired state indicating that at least one redundant component which serves to enhance a performance or reliability of the virtual network has failed,
determine the virtual network provides a required connectivity to the candidate host computer; and
migrate the virtual machine on the first host computer while the virtual network is is operating in the impaired state.

15. The system of claim 14, wherein the agent in the hypervisor is further configured to:
identify the state of the virtual network;
when the state is identified as unavailable:
the virtual network does not meet connectivity requirements; and
the virtual machine is not migrated to the candidate host computer.

16. The system of claim 15, wherein the agent is further configured to transmit the operational status of the virtual network to the hypervisor, and the hypervisor is configured to receive the operational status of the virtual network and store the operational status of the virtual network in a repository.

17. The system of claim 16, wherein the hypervisor is further configured to:
receive a request for the operational status of the virtual network from the virtual machine management server; and
responsive to receiving the request, read the operational status of the virtual network from the repository and transmit the operational status of the virtual network to the virtual machine management server.

18. The system of claim 17, wherein the first host computer has executing therein a virtual network management agent and a virtual machine management agent, and the hypervisor is further configured to:
receive the operational status of the virtual network from the virtual network management agent; and
receive the request for the operational status of the virtual network from the virtual machine management server via the virtual machine management agent.

19. The method of claim 16, wherein the operational status of the virtual network is expressed as a name/value pair, wherein the name is an identifier of the virtual network and the value indicates the operational status of the virtual network.

20. The system of claim 14, wherein the virtual network is a logical network implemented by a set of network devices to which one or more virtual machines connect in order to communicate.

* * * * *